Patented Mar. 15, 1927.

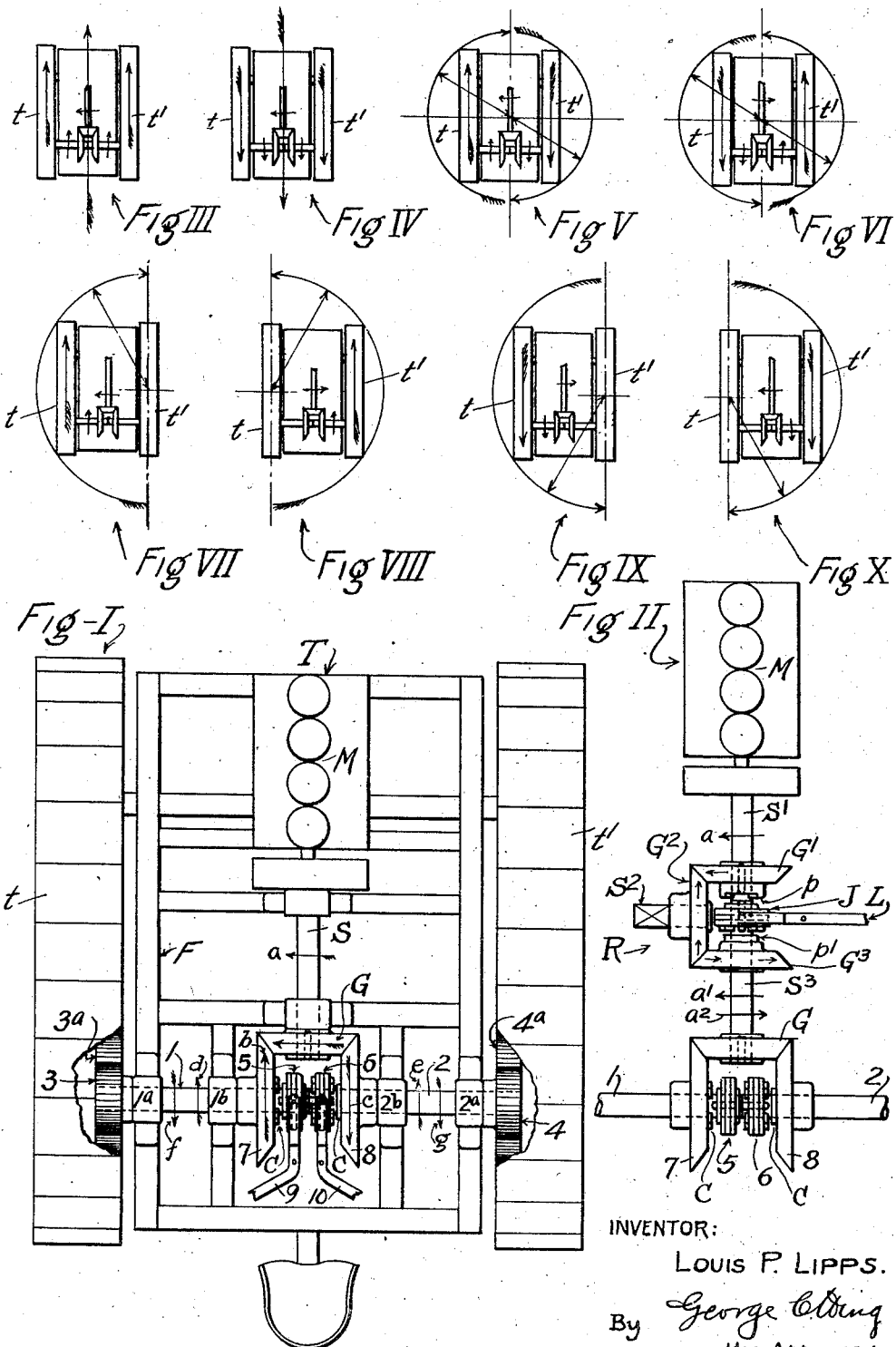

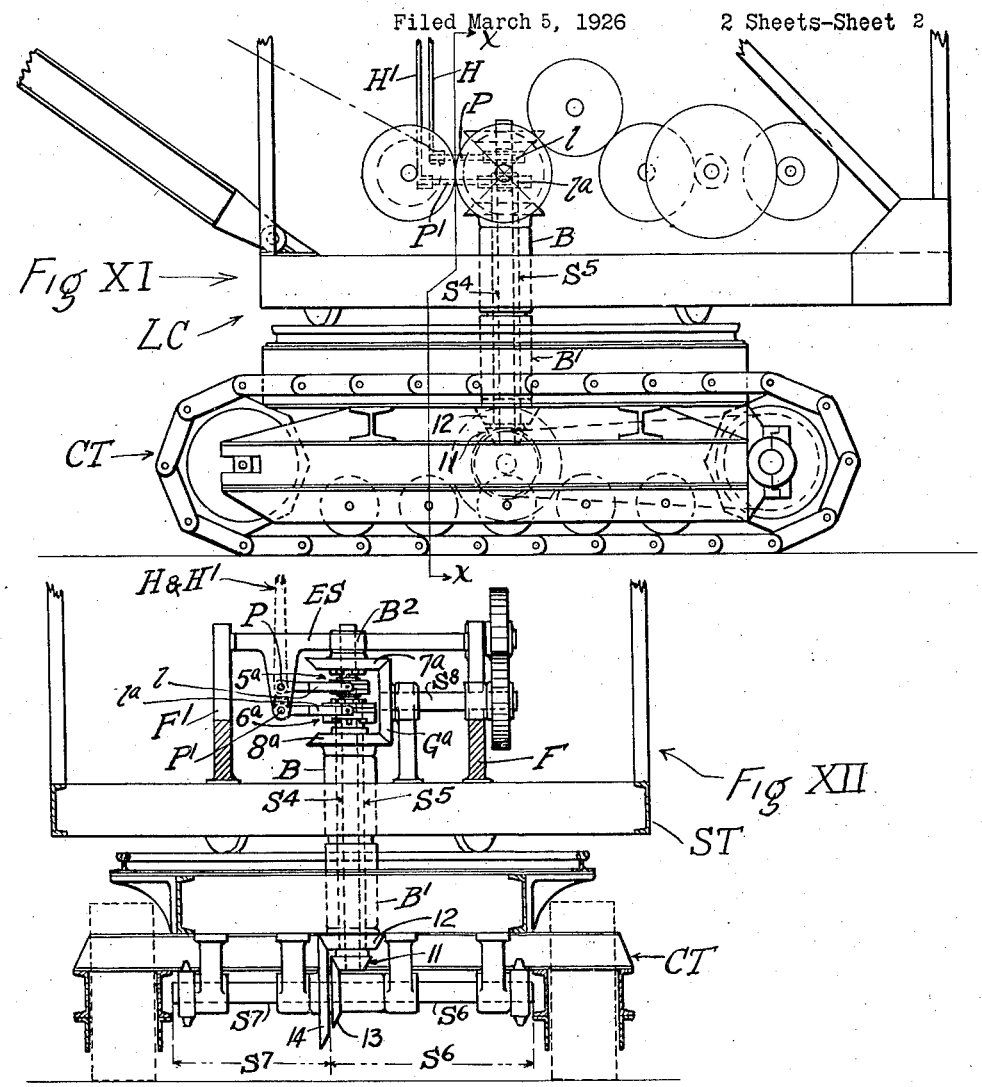

1,620,668

UNITED STATES PATENT OFFICE.

LOUIS P. LIPPS, OF CLEVELAND, OHIO, ASSIGNOR TO THE BROWN HOISTING MACHINERY COMPANY, OF CLEVELAND, OHIO, A CORPORATION.

STEERING MECHANISM FOR CREEPER TRACTORS.

Application filed March 5, 1926. Serial No. 92,469.

The invention relates to means for steering creeper tractors wherein the transmission mechanisms, by the introduction of extra parts and the novel correlation of such parts, are utilized to effect the steering.

Since there is much competition in the tractor industry, manufacturers are confronted with the problem of obtaining as many of the eight possible traveling and steering directions for their tractors as is possible without burdening or complicating the trasmission mechanism with a multiplicity of parts. To this end, simplicity in design and a corresponding reduction in production costs are important. Obviously, the more clutches and brakes that are introduced into a transmsision system for steering purposes, the more controlling lever systems are required, which, of course, adds to the cost of the tractors and complicates the operators' manipulations.

It is the object of the present invention to provide for as many of the possible driving directions as the practical use of this type of tractor will be subjected to, and, to simplify the transmission mechanisms now in use, which, latter as far as I know invariably employ special reversing mechanisms in the transmission systems.

Without reversing gears for instance modern transmission mechanisms can only negotiate three driving (or steering) directions, that is to say, straight ahead; to the right, pivoting on the right creeper track; and, to the right pivoting between the creeper tracks, at the center of the tractor.

My invention, even when operated without special reversing gears, contemplates two additional driving directions with the addition of but one extra clutch. The additional directions thereby obtained are to the rear, straight, and a left turn to the rear that pivots about the left creeper track.

In the accompanying drawings, Figure I is a plan view of a creeper tractor, embodying the principles of the invention; Figure II is a plan view of the principal constituent members of the invention, amplified, with reversing gears introduced between the invention proper and the prime mover or source of power; Figures III to X, inclusive, are diagrams showing the eight possible steering and driving directions for creeper tractors when the same are equipped with the requisite clutches, gears, etc.; Figure XI is a side elevation of a creeper tractor surmounted with a revolvable superstructure, in fragmentary outline, upon which is shown the prime mover and the prime elements of the main invention, and Figure XII is a sectional view on the line x—x in Figure XI.

For the purpose of disclosing the invention I show the correlated elements associated with a creeper tractor T. These embody a frame F and creeper-tracks $t$ and $t^1$. As shown, aligned shafts 1 and 2 are mounted on and transversely of the frame F, near the rear end thereof in, respectively, bearings $1^a$ and $1^b$, and, $2^a$ and $2^b$. The shafts 1 and 2 project beyond the sides of the tractor frame F far enough to accommodate spur pinions 3 and 4 that mesh with, respectively internal spur-gears $3^a$ and $4^a$ which are adapted to propel the creeper tracks, and, inwardly, to the median line of the tractor. The inner ends of the shafts 1 and 2 are provided with double faced jaw-clutches 5 and 6 which are slidably keyed to the same. Upright bevel gears 7 and 8 are freely mounted, respectively, on the shafts 1 and 2 near their inner ends in close juxtaposition to the jaw clutch 5 in one case and to jaw clutch 6 in the other case. These bevel gears are provided with clutch engaging projections C, C on their inner faces.

At the forward end of the tractor, and, on the median line of the same is located an engine or motor M for actuating the transmission mechanism. A shaft S extends from the motor M to within a short distance of the inner ends of the aligned shafts 1 and 2. The rearward end of the shaft carries a bevel gear G that is keyed to the same and meshes with the bevel gears 7 and 8 on the inner ends of the aligned shafts 1 and 2. Clutch levers for operating the jaw-clutches 5 and 6 are indicated at 9 and 10, respectively.

It will be evident, upon referring to Figure I, that when the prime moving shaft S is rotated in the direction indicated by the arrow $a$ the gear G will rotate in the same direction, the gear 7 will rotate in the direction indicated by arrow $b$ and the gear 8 will rotate in the direction indicated by the arrow $c$. Gears 7 and 8 being loosely mounted on their respective shafts will, of course, rotate whenever the shaft S is actuated by the motor M, and without moving those shafts. With the above described novel correlation of gears, clutches and aligned shafts, five of the eight possible driving and steering directions can be maneuvered. The directions, and gear, clutches and shaft combinations for effecting those steering and driving directions are as follows:

(1) To drive ahead (see Fig. III): Throw clutch 5 into engagement with bevel gear 7 and clutch 6 into engagement with clutch 5. With the mechanisms thus engaged, the gear 7 and the shaft 2 are locked to the shaft 1. The shafts now rotate in the direction indicated by arrows $d$ and $e$.

(2) To drive straight to the rear (see Fig. IV): Throw clutch 6 into engagement with bevel gear 8 and clutch 5 into engagement with clutch 6. These engagements lock gear 8 and shaft 1 to shaft 2 and the shafts will rotate in the direction indicated by arrows $f$ and $g$.

(3) To drive to the right (ahead) pivoting about track $t^1$ or the right creeper track (see Fig. VIII): Throw clutch 5 into engagement with gear 7 and keep clutch 6 in the neutral position. This arrangement locks gear 7 to shaft 1 and the latter is rotated in the direction indicated by the arrow $d$. The shaft 2 remains idle.

(4) To drive to the left (backing) pivoting about track $t$ or the left creeper track (see Fig. X): Throw clutch 6 into engagement with the bevel gear 8 and keep clutch 5 in the neutral position. This arrangement locks gear 8 to shaft 2 and the latter is rotated in the direction indicated by the arrow $g$. The shaft 1 remains idle.

(5) To drive to the right (ahead) or to the left (backing) pivoting about the center of the tractor (see Fig. V): Throw the clutches into engagement with their respective or adjacent gears. This combination rotates the shafts 1 and 2 in reverse relation as indicated by the arrows $d$ and $g$.

Amplifications of the driving and steering directions may be had by either employing a reversing engine for actuating the transmission mechanism or introducing special reversing mechanism R (see Figure II) between the gear G and the source of power M. In the special arrangement for this purpose shown, the motor shaft $S^1$ has a bevel gear $G^1$, provided with clutch engaging projectings or lugs $p$, keyed to its outer end. Meshing with the bevel-gear $G^1$ and loosely mounted on a stub-shaft $S^2$ that is positioned at right angles to the motor shaft $S^1$ is a bevel gear $G^2$ that also meshes with a bevel gear $G^3$ that is loosely mounted on a shaft $S^3$ that is aligned with the motor shaft $S^1$. The gear $G^3$ is provided with clutch engaging lugs $p^1$. The shaft $S^3$ extends from the end of the shaft $S^1$ to a distance to serve in place of the shaft S to engage and support the bevel gear G of the bevel-gear nest above referred to. A double faced jaw-clutch J is located at the end of the shaft $S^3$ intermediately of the bevel gears $G^1$ and $G^3$ and is slidably keyed to said shaft. A lever L controls the clutch J.

It is evident, that when the clutch J is made to engage the gear $G^1$ the shaft $S^3$ will rotate in the same direction as the motor shaft $S^1$ because the gear $G^3$ is loosely mounted thereon, and, consequently all the driving directions obtained by the arrangement of the gears shown in Figure I can be had. It is also evident that when the clutch J is made to engage the gear $G^3$, such engagement will reverse the direction of rotation of the shaft $S^3$ (see arrow $a^2$, Figure II) and, consequently, all the additional steering and driving directions which are outlined in Figures III, IV, V, VII and X may be obtained. It will be noted that the steering directions shown in Figures VI, VIII and IX may also be negotiated with said reversing gear, and, that when said reversing gear is thus introduced and used the forward and backward driving is also obtainable. By the correlation of gears and clutches shown in Figure II a very flexible steering mechanism is evolved because five steering directions can be had with the shaft $S^3$ rotating in a given direction and a like number can be had by reversing the direction of rotation of that shaft, and in all, the eight steering directions are made possible. Obviously the reversing gear shown at R can be dispensed with if a reversing engine is employed.

Since the advent of the creeper tractors, whose chief utility was that of replacing draft horses, manufacturers of locomotive cranes and steam-shovels have been quick to see the advantages these had over the traction wheel type as a means for propelling huge pieces of machinery. Often the condition of the ground over which the cranes and shovels of the four-wheel type had to travel was such that locomotion was impossible, and in some instances these units would become mired. The adoption of creeper belts solved their traction problem, but as yet nothing has been evolved that nearly approaches an ideal means for steering creeper tractors from revolvable superstructures.

In the present state of the art most makes of cranes and shovels locate the brake and clutch mechanisms for steering on the tractor frame. This location is unsatisfactory, because of the inaccessibility of the parts involved and their proximity to the ground. Besides these disadvantages a complicated system of remote control, which comprises a multiplicity of levers, links and other gearing, is required.

As will appear herein my invention not only makes possible the location of the steering gear upon the upper works and in immediate accessibility to the operator but reduces the number of bevel gears and other parts employed.

A further important and highly desirable object of this invention is to eliminate, in crane and steam-shovel constructions, the disadvantages referred to above and to provide in the simplest manner, a direct control, for steering such constructions from their revolvable superstructures regardless of what relation the superstructure has with the tractor's frame or base. This object is attained by the novel collocation of bevel gears, clutches and aligned shafts shown in Figures XI and XII wherein L C is a locomotive-crane provided with a creeper tractor truck CT. As cranes of this type are familiar to those versed in the art no attention will be given here to the details and general construction of the same. In the arrangement to be described, concentric shafts $S^4$ and $S^5$ are located at the center of rotation of the superstructure and are supported by bearings B and $B^1$ which are fastened respectively to the superstructure ST and the tractor-frame CT. These shafts extend below the tractor frame far enough to engage bevel pinions 11 and 12 that mesh respectively with bevel gears 13 and 14 on transmission cross-shafts $S^6$ and $S^7$. The upper end of the inner concentric shaft $S^4$ extends through a bearing $B^2$ of an engine-housing separator ES supported by the side-frame F and $F^1$. The other concentric shaft $S^5$ which is hollow and through which the shaft $S^4$ passes, extends upwardly from the bearing B to a point about midway of that bearing and the bearing $B^2$. Bevel gears $7^a$ and $8^a$ corresponding, respectively, to gears 7 and 8 in Figure I are loosely mounted, respectively, on and near the upper ends of the shafts $S^4$ and $S^5$. Meshing with these bevel gears and corresponding with bevel gear G is a bevel gear $G^a$ that is supported by the horizontal driving shaft $S^8$ pertaining to the power mechanism customarily carried on the superstructure. All the gears above referred to, excepting gears $7^a$ and $8^a$ are keyed to their respective shafts. Clutch $5^a$ is slidably mounted on the shaft $S^4$ between the gear $7^a$ and the upper end of the shaft $S^5$. Clutch $6^a$ is slidably mounted on and at the upper end of the hollow shaft $S^5$, between the bevel gear $8^a$ and the clutch $5^a$. Clutch yoke-levers 1 and $1^a$ engage, respectively, the clutches $5^a$ and $6^a$, they are keyed respectively to the pivot-shafts P and $P^1$ which, respectively carry the hand levers H, and $H^1$. By operating the clutches $5^a$ and $6^a$ in the same manner as in the combinations that include clutches 5 and 6 (Figure I) the same driving directions (Figures III, IV, V, VII, and X) can be negotiated as those described for the creeper-tractor proper. Of course, by introducing a reversing mechanism between the gear $G^a$ and the source of power or by employing a reversing engine, a reversal of the above driving directions can be had which would cover and include the directions illustrated by Figures VI, VIII and IX.

Having thus pointed out and described the novel features of my invention, what I wish to protect by Letters Patent is:

In a locomotive crane of the creeper tractor type, having a revolvable superstructure and a source of power thereon, the combination of a pair of concentrically arranged shafts extending vertically downward from said superstructure through the center of rotation of the same to and within the tractor frame below, a pair of right and left transversely aligned tracks-driving shafts extending inwardly from the sides of the frame to a point beneath the lower ends of said concentrically arranged shafts, a bevel gear on the inner end of each of said track-driving shafts, bevel pinions on the lower end of said concentrically arranged shafts in mesh, respectively, with the bevel gears on said inner ends of said track-driving shafts, a pair of spaced-apart horizontally disposed bevel gears of the same diameter provided with clutch-engaging means, freely mounted on the upper portions respectively of said concentrically arranged shafts, a power shaft operatively connected with said source of power extending to said interspace between said bevel gears on said upper portions, an upright bevel gear fixedly mounted on the free end of said power shaft in mesh with the bevel gears on said upper portions, double-faced clutch mechanisms slidably mounted on said upper portions, provided with means for clutch engagement, one with the other, or with the next adjoining of said horizontally disposed bevel gears, when contacting therewith for the purpose, together with means for selectively actuating said clutches into one or the other of such engagements, substantially as shown and described.

In testimony whereof I hereunto affix my signature.

LOUIS P. LIPPS.